US008517813B2

(12) United States Patent
Berman et al.

(10) Patent No.: US 8,517,813 B2
(45) Date of Patent: Aug. 27, 2013

(54) REEL-TYPE GAMING ACTIVITY INVOLVING AUTOMATIC RANDOMIZATION OF A SUBSET OF REELS

(76) Inventors: Bradley Berman, Minnetonka, MN (US); Chad Shapiro, Plymouth, MN (US)

( * ) Notice: Subject to any disclaimer, the term of this patent is extended or adjusted under 35 U.S.C. 154(b) by 865 days.

(21) Appl. No.: 12/077,719

(22) Filed: Mar. 20, 2008

(65) Prior Publication Data

US 2008/0234033 A1 Sep. 25, 2008

Related U.S. Application Data

(60) Provisional application No. 60/919,362, filed on Mar. 22, 2007.

(51) Int. Cl.
*A63F 13/00* (2006.01)

(52) U.S. Cl.
USPC ............ 463/20; 463/16

(58) Field of Classification Search
USPC ............ 273/138.1, 138.2; 463/16, 20, 21, 463/22, 25
See application file for complete search history.

(56) References Cited

U.S. PATENT DOCUMENTS

| | | | | |
|---|---|---|---|---|
| 5,722,891 | A * | 3/1998 | Inoue | 463/20 |
| 7,090,580 | B2 | 8/2006 | Rodger et al. | |
| 2002/0010017 | A1* | 1/2002 | Bennett | 463/20 |
| 2004/0072612 | A1* | 4/2004 | Rodgers et al. | 463/20 |
| 2005/0070354 | A1* | 3/2005 | Baerlocher et al. | 463/20 |
| 2006/0040728 | A1* | 2/2006 | Fuller | 463/20 |
| 2006/0246989 | A1 | 11/2006 | Glavich et al. | |
| 2006/0247031 | A1 | 11/2006 | Walker et al. | |
| 2006/0247040 | A1 | 11/2006 | Walker et al. | |

* cited by examiner

*Primary Examiner* — James S McClellan

(57) ABSTRACT

A gaming apparatus has a plurality of gaming reels. Each gaming reel has a plurality of symbols that are randomly arranged in response to gaming events. A controller is coupled to the gaming reels and configured to randomize, in response to a user input, the plurality of gaming reels so that the gaming reels are in a first configuration. Based on the first configuration of the gaming reels, an arrangement of the symbols that satisfy a predetermined condition is determined. In response to the predetermined condition being satisfied, a subset of the gaming reels is randomized so that the gaming reels are in a second configuration. The subset of gaming reels is randomized independently of any user inputs occurring after the determination of the predetermined condition, and the gaming reels not in the subset of reels are held while the subset of gaming reels is randomized. The apparatus also includes a payout device that determines a payout based at least on the second configuration of the plurality of gaming reels in response to the randomization of the subset of gaming reels.

25 Claims, 7 Drawing Sheets

REEL-TYPE GAMING ACTIVITY INVOLVING AUTOMATIC RANDOMIZATION OF A SUBSET OF REELS

RELATED APPLICATIONS

This application claims the benefit of Provisional Application No. 60/919,362, filed on Mar. 22, 2007, to which priority is claimed pursuant to 35 U.S.C. §119(e), and which is hereby incorporated herein by reference in its entirety.

FIELD OF THE INVENTION

This invention relates in general to games, and more particularly to apparatuses and methods for wagering games.

BACKGROUND OF THE INVENTION

Casino games such as poker, slots, and craps have long been enjoyed as a means of entertainment. Almost any game of chance that can be played using traditional apparatus (e.g., cards, dice) can be simulated on a computer. The popularity of casino gambling with wagering continues to increase, as does recreational gambling such as non-wagering computer game gambling. It is also likely that most new games will be implemented, at least in part, using computerized apparatus.

One reason that casino games are widely implemented on computerized apparatus is that computerized games are highly adaptable, easily configurable and re-configurable, and require minimal supervision to operate. For example, the graphics and sounds included in such games can be easily modified to reflect popular subjects, such as movies and television shows.

Computer gaming devices can also be easily adapted to provide entirely new games of chance that might be difficult to implement using mechanical or discrete electronic circuits. Because of the ubiquity of computerized gaming machines, players have come to expect the availability of an ever wider selection of new games when visiting casinos and other gaming venues. Playing new games adds to the excitement of "gaming." As is well known in the art and as used herein, the term "gaming" and "gaming devices" generally involves some form of wagering, and that players make wagers of value, whether actual currency or some equivalent of value, e.g., token or credit. Wagering-type games usually provide rewards based on random chance as opposed to skill. In some jurisdictions, the absence of skill when determining awards during game play is a requirement.

The present disclosure describes methods, systems, and apparatus that provide for new and interesting gaming experiences, and that provide other advantages over the prior art.

SUMMARY OF THE INVENTION

To overcome limitations in the prior art described above, and to overcome other limitations that will become apparent upon reading and understanding the present specification, the present invention discloses a gaming apparatus having a plurality of gaming reels. Each gaming reel has a plurality of symbols that are randomly arranged in response to gaming events. A controller is coupled to the gaming reels and configured to a) randomize, in response to a user input, the plurality of gaming reels so that the gaming reels are in a first configuration; b) determine, based on the first configuration of the gaming reels, an arrangement of the symbols that satisfy a predetermined condition; and c) randomize, in response to the predetermined condition being satisfied, a subset of the gaming reels so that the plurality of gaming reels are in a second configuration. The subset of gaming reels is randomized independently of any user inputs occurring after the determination of the predetermined condition, and the gaming reels not in the subset of reels are held while the subset of gaming reels is randomized. The apparatus also includes a payout device that determines a payout based at least on the second configuration of the plurality of gaming reels in response to the randomization of the subset of gaming reels.

In more particular embodiments, the predetermined condition includes a winning condition formed by the held gaming reels. For example, the winning condition may include a sequence of matching symbols located in neighboring cells of the held gaming reels. In such a case, the winning condition may require that the matching symbols be high symbols selected from the plurality of symbols.

In other, more particular embodiments, the predetermined condition includes a wild symbol being located in one or more of the held gaming reels. In other arrangements, the predetermined condition includes a special symbol being located in one or more of the held gaming reels, and the special symbol at least designates that the predetermined condition is satisfied for the one or more of the held gaming reels. In such a case, the predetermined condition may further include a user selection that occurs before the gaming reels are randomized into the first configuration. The user selection may include a side wager. In such a case, the controller may further cause one or more of the subset of the gaming reels to be repeatedly randomized in response to the predetermined condition being satisfied, such that a number of the repeated randomizations is determined by an amount of the side wager.

In other, more particular embodiments, the controller further causes one or more of the subset of the gaming reels to be randomized two or more times in response to the predetermined condition being satisfied. The one or more of the subset of the gaming reels may include the entire subset of the reels. In one arrangement, the one or more of the subset of the gaming reels includes a selected subset of the subset of the gaming reels. The selected subset is determined based on gaming reels that are in the subset of the gaming reels but not in the selected subset forming a winning condition with the held reels.

In another embodiment of the invention, a method involves randomizing, in response to a user input, a plurality of gaming reels so that the gaming reels are in a first configuration. Based on the first configuration of the gaming reels, a determination is made whether an arrangement of symbols of the gaming reels satisfy a predetermined condition. In response to the predetermined condition being satisfied, a subset of the gaming reels are randomized so that the plurality of gaming reels are in a second configuration. The subset of gaming reels is randomized independently of additional user inputs occurring after the determination of the predetermined condition, and the gaming reels not in the subset of reels are held while the subset of gaming reels is randomized. A payout is provided based at least on the second configuration of the plurality of gaming reels in response to the randomization of the subset of gaming reels.

In more particular embodiments, the predetermined condition includes a winning condition formed by the held gaming reel, such as a sequence of matching symbols located in neighboring cells of the held gaming reels. The winning condition may require that the matching symbols be high symbols selected from the plurality of symbols. The predetermined condition may include a wild symbol being located in one or more of the held gaming reels. In other cases, the predetermined condition involves a special symbol being located in one or more of the held gaming reels, where the special symbol at least designates that the predetermined condition is satisfied for the one or more of the held gaming reels. The predetermined condition may further involve a user selection that occurs before the gaming reels are randomized into the first configuration. The user selection may include a side wager, and randomizing the subset of the gaming reels may involve repeatedly randomizing one or more of the subset of the gaming reels to be in response to the predetermined condition being satisfied. In such a case, a number of the repeated randomizations is determined by an amount of the side wager.

In other more particular embodiments, randomizing the subset of the gaming reels involves randomizing one or more of the subset of the gaming reels two or more times in response to the predetermined condition being satisfied. In one arrangement, the one or more of the subset of the gaming reels includes the entire subset of the reels. In another arrangement, the one or more of the subset of the gaming reels includes a selected subset of the subset of the gaming reels, and the selected subset is determined based on gaming reels that are in the subset of the gaming reels but not in the selected subset forming a winning condition with the held reels.

BRIEF DESCRIPTION OF THE DRAWINGS

The invention is described in connection with the embodiments illustrated in the following diagrams.

DETAILED DESCRIPTION OF THE INVENTION

Figure 1:
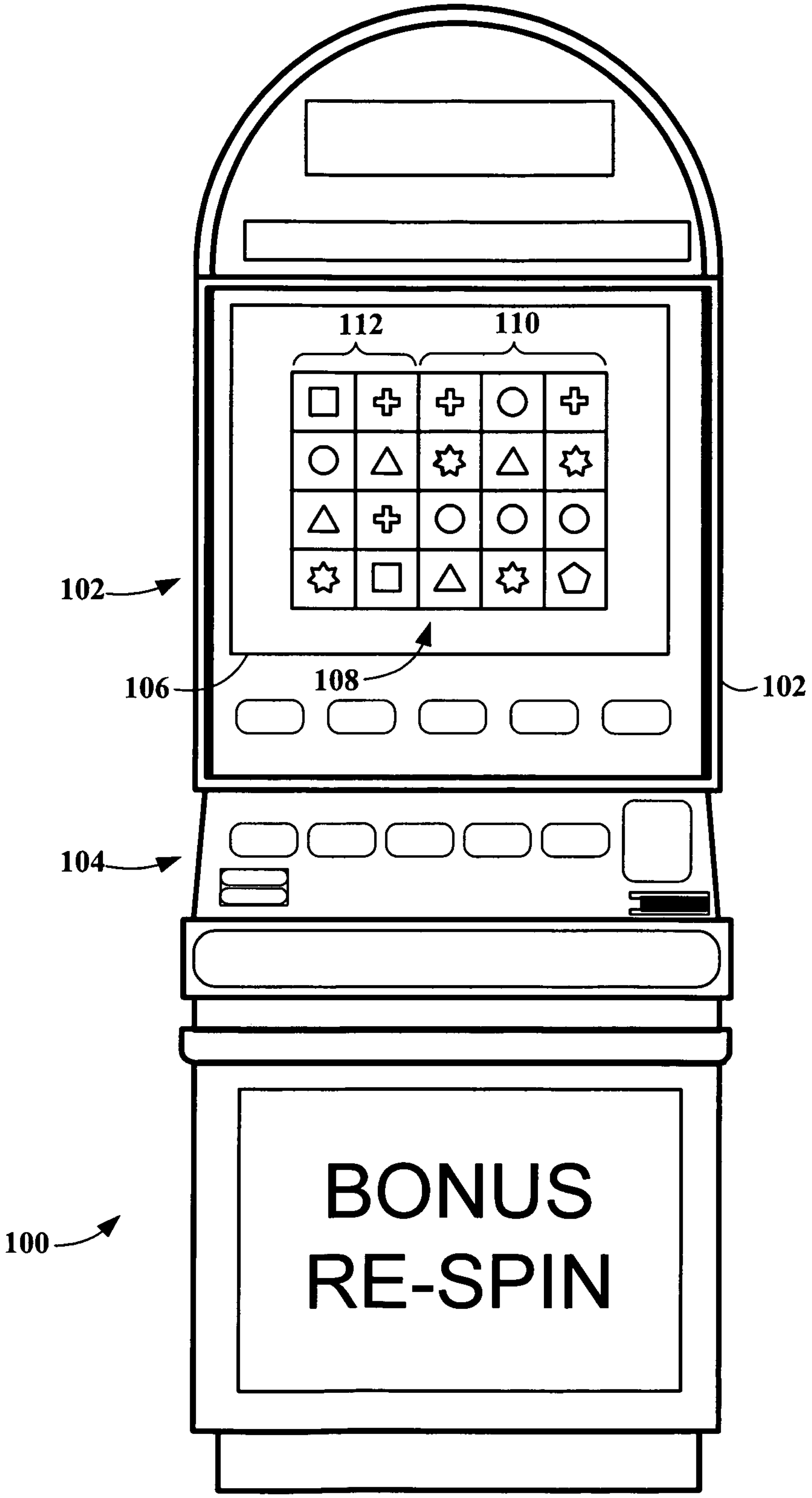
FIG. 1. is a diagram of a gaming machine according to an embodiment of the invention.

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Generally, the present invention relates to a wagering game that may resemble a reel-type gaming apparatus such as slot machines. Generally, a reel-type apparatus provides a gaming activity that involves randomly arranging symbols in such a way as to provide a payout. A commonly implemented form of this apparatus involves using a number of side-by-side circular reels that spin on the same axis. These reels may be mechanical devices (e.g., wheels or hoops) or may be simulated via a computer and video display. The reels have symbols printed on their surface, and the player is provided a monetary award when the selected symbols form a pattern, such as when a line that spans a number of the reels has the same symbol (or satisfies some other pattern or condition). This line that connects symbols is sometimes referred to as the pay line (or payout line), and pay lines may be horizontal, diagonal or other shapes besides a straight line.

In an apparatus according to an embodiment of the invention, after a reel-spin gaming event, winning combinations are evaluated. If a subset of the reels satisfy a condition, such as forming a winning combination or forming a particular arrangement of symbols, then the subset of the reels remain fixed while the remaining reels are automatically re-spun. The new configuration, which is based on the held subset of reels and newly spun reels, is evaluated to determining any additional winnings. This re-spin of the other reels is automatic, and is not based on a user selection. As such, this feature not does it involve the use of skill on the part of the player.

In the description that follows, the term “reels,” “reel strips,” and similar mechanically descriptive language may be used to describe various apparatus presentation features. Although the present disclosure may be applicable to both to mechanical and computerized embodiments, and any combination therebetween, the use of mechanically descriptive terms is not meant to be only applicable to mechanical embodiments. Those skilled in the art will understand that, for purposes of providing gaming experiences to players, mechanical elements such as reels may be simulated on a display in order to provide a familiar and satisfying experience that emulates the behavior of mechanical objects. Further, the computerized version may provide the look of a reel (e.g., a linear arrangement of symbols) and inter-reel elements but are randomized in a way different than a spinning reel, such as by randomly and independently changing each cell of the reel that has a symbol. Thus, the term “reels,” “reel strips,” etc. are intended to describe both physical objects and emulation or simulations of those objects using electronic apparatus.

In various embodiments of the invention, the gaming displays are described in conjunction with the use of data in the form of “symbols.” In the context of this disclosure, a “symbol” refers to a collection of one or more arbitrary indicia or signs that have some conventional significance. In particular, the symbol represents values that can at least be used to determine whether to award a payout. A symbol may include numbers, letters, shapes, pictures, textures, colors, sounds, etc., and any combination therebetween. A win can be determined by comparing the symbol with another symbol. Generally, such comparisons can be performed via software by mapping numbers (or other data structures such as character strings) to the symbols and performing the comparisons on the numbers/data structures.

In reference now to FIG. 1, a gaming machine 100 is illustrated that provides a gaming experience according to an embodiment of the invention. The illustrated gaming machine 100 may include a computing system (not shown) to carry out operations according described herein. The gaming machine 100 includes a display 102, and a user interface 104, although some or all of the user interface 104 may be provided via the display 102 in touch screen embodiments. The user interface 104 allows the user to control and engage in play of the gaming machine 100. The particular user interface mechanisms included with user interface 104 may be dependent on the type of gaming machine. For example, the user interface 104 may include one or more buttons, switches, joysticks, levers, pull-down handles, trackballs, voice-activated input, or any other user input system or mechanism that allows the user to play the particular gaming activity.

The user interface 104 may allow the user to enter coins, bills, or otherwise obtain credits through vouchers, tokens, credit cards, tickets, etc. Various mechanisms for entering such vouchers, tokens, credit cards, coins, tickets, etc. are known in the art. For example, coin/symbol input mechanisms, card readers, credit card readers, smart card readers, punch card readers, radio frequency identifier (RFID) readers, and other mechanisms may be used to enter wagers. It is through the user interface 104 that the user can initiate and engage in gaming activities. While the illustrated embodiment depicts various buttons for the user interface 104, it should be recognized that a wide variety of user interface options are available for use in connection with the present invention, including pressing buttons, touching a segment of a touch-screen, entering text, entering voice commands, or other known data entry methodology.

The display device 102 may include one or more of an electronic display, a mechanical display, and fixed display information such as information such as paytable information associated with a glass/plastic panel on the gaming machine 100. The symbols or other indicia associated with the play of the game may be presented on an electronic display device. Generally, the display 102 devotes the largest portion of viewable area to the primary gaming portion 106. The gaming portion 106 is generally where the visual feedback for any selected game is provided to the user. The gaming portion 106 may render graphical objects such as cards, slot reels, dice, animated characters, and any other gaming visual known in the art. The gaming portion 106 also typically informs players of the outcome of any particular event, including whether the event resulted in a win or loss.

Figure 2:
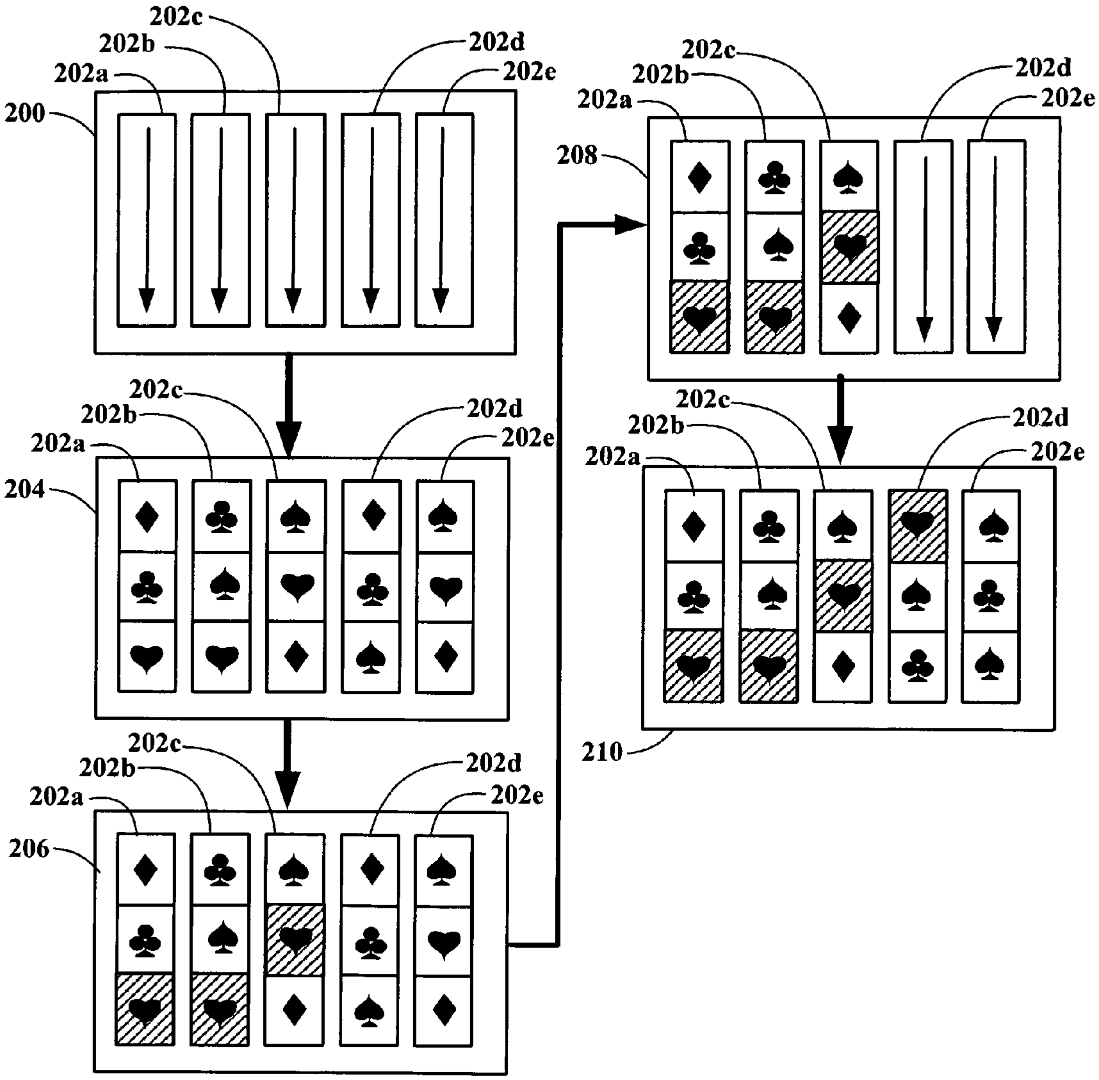
FIG. 2 is a sequence diagram showing a sequence of gaming screens in a gaming apparatus according to an embodiment of the invention.

In the illustrated embodiment, the gaming portion 106 displays a set of primary reels 108. The reels 108 each include symbols that may be animated so that the symbols appear to be on the surface of a wheel that is rotating vertically when game play is initiated. As is known in the art, when the symbols of the reels stop moving (typically after a random amount of time when physical reel devices are involved), the player may be provided a monetary award if some set of symbols on adjacent reels 108 satisfy some criteria. In addition, some subset of the reels, e.g., subset 110, may be selected based on this win criteria, such as the row of three matching circles seen in subset 110. The other reels not in the subset, e.g., subset 112, are spun again automatically for an additional turn. The configuration of the both subsets of reels 110, 112 after the re-spin determines a secondary payout The sequence diagram of FIG. 2 shows an example of how a reel-type game that includes automatic, selective re-spins may proceed according to an embodiment of the invention. Screen 200 shows reels 202*a-e* being randomized by spinning, as indicated by the vertical arrows. The screen 200 is typically seen after the player has made a wager and initiated play, such as by pulling a lever or pushing a button. The randomization of the symbols associated with the reels 202*a-e* may be accomplished in other ways besides using vertically spinning reels, such as by independently randomizing cells within each of the reels 202*a-e*. The spinning of the reels 202*a-e* seen in screen 200 may be in response to a primary gaming event, a bonus event, or some other play event or feature.

In screen 204, the randomization of reels 202*a-e* is complete, and wins may be evaluated at this time. The evaluation of wins is shown in screen 206, which shows shaded cells that correspond to a payline or winning sequence. The indicated win involves a subset of the reels 202*a-e*, in particular reels 202*a-c*. A sequence of symbols formed by reels 202*a-c* matches a predetermined criteria (e.g., three neighboring cells having a high symbol) and therefore reels 202*d-e* are re-spun, as is shown in screen 208. Screen 210 shows an additional win evaluation that occurs after reels 202*d-e* have stopped spinning. As can be seen by the additional highlighted cell in reel 202*d*, an additional match has occurred, and additional payout is provided based on this match.

The re-spinning of some of the reels may occur only based on certain conditions occurring with the other reels. For example, the re-spin may only occur if the matching of the other reels involves high symbols, wild symbols, or other special symbols. The re-spin may be activated by the player placing a side bet before the initial spin, and this could be allowed instead of or in addition to special symbols that trigger a re-spin. In some cases, special symbols or side bets may be able to activate more than one re-spin. In the example of FIG. 2, if the player had paid to activate three re-spins, if needed, then reels 202*d-e* would be re-spun and wins re-evaluated two more times similar to what is shown in screens 208, 210.

Another example of how multiple re-spins may be applied may be demonstrated by referring again to screen 210 of FIG. 2. This screen 210 resulted from a re-spin, and as described above, triggered an additional winning event due to the matching symbol appearing in reel 202*d* with symbols of reels 202*a-c*. If the player has paid for more than one re-spin in such a case, the re-spin may be applied only to the remaining reel 202*e*, instead of to both 202*d* and 202*e*. Thus, if the player has wagered a side bet for three additional spins, reel 202*e* may be re-spun two more time in an attempt to get yet another win, e.g., a sequence of five matching symbols. Even where the side bet only activates a single re-spin (or where no side bet is required), the game may automatically spin additional reels (e.g., reel 202*e*) if a reel that was re-spun once (e.g., reel 202*d*) results in an additional winning event.

In another variation, instead of re-spinning reels 202*e-f*, only the symbols that are next in sequence on the pay line for which a pay could be made would spun. For example, if the paylines are limited to horizontal lines, and the initial win included three symbols along the bottom row of a first set of reels, only the symbols of the remaining reels along the bottom row will be re-spun. This latter example may be implemented in reel type games where individual cells can be randomized independent of other cells on the same reel.

Figure 3:
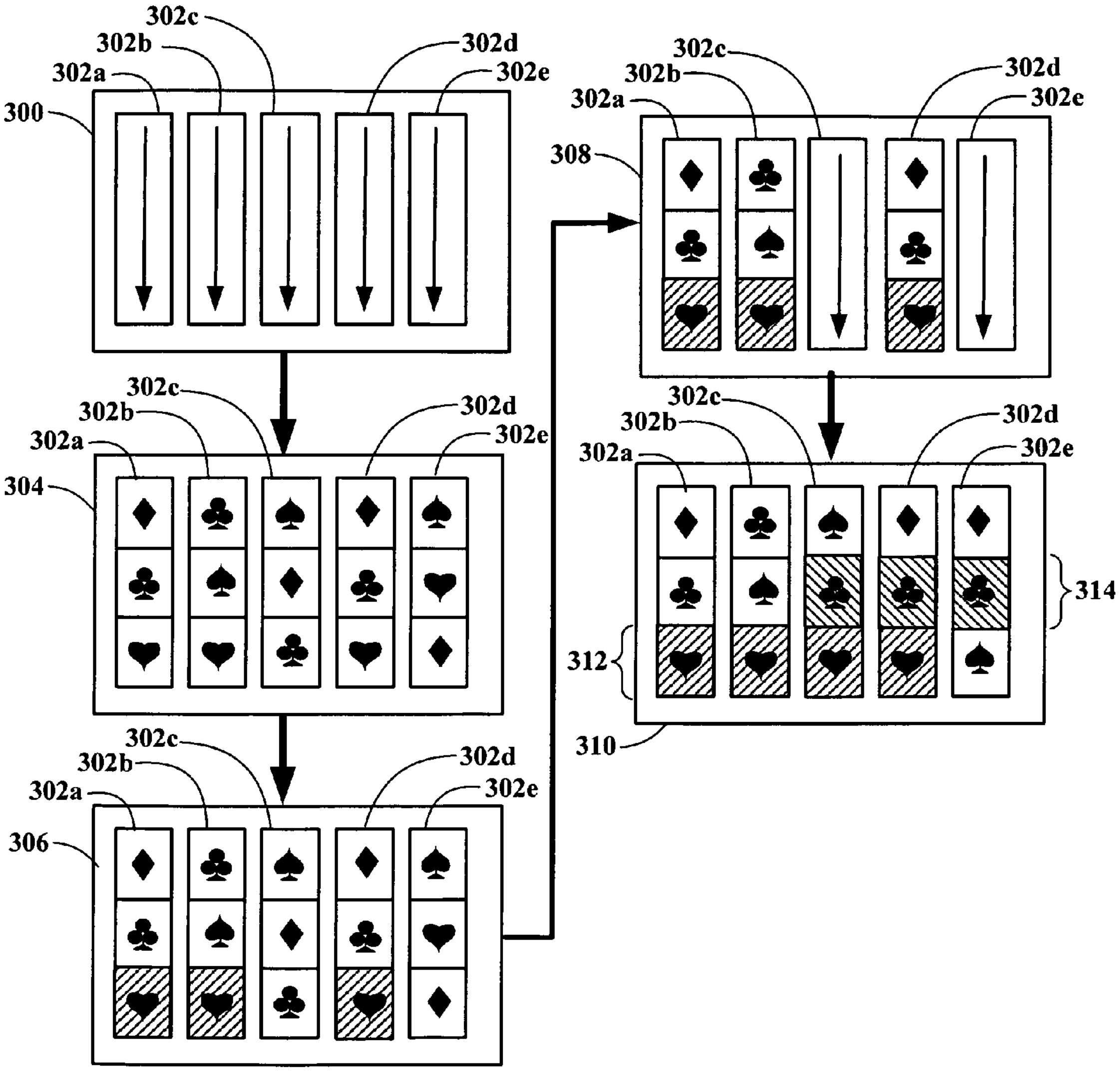
FIG. 3 is a sequence diagram showing an alternate sequence of gaming screens in a gaming apparatus according to an embodiment of the invention.

It will be appreciated that a re-spin may be automatically awarded even when the first spin did not result in a win. One example of this according to an embodiment of the invention is shown in FIG. 3. Screen 300 shows reels 302*a-e* being randomized by spinning, as indicated by the vertical arrows. In screen 304, the randomization of reels 302*a-e* is complete, and in this case, the reels 302*a-e* may not form a winning combination. However, as is indicated by shaded cells in screen 306, three matching symbols lie on a payline, although not in sequences. If the re-spin feature is activated and can be triggered by such an event, the reels 302*a*, 302*b*, and 302*d* are held, and reels 302*c* and 302*e* are re-spun, as is shown in screen 308.

Screen 310 shows the win evaluation that occurs after reels 302*c* and 302*e* have stopped spinning. As can be seen by the shaded row 312, the re-spinning has cause a four-in-a-row match, and a payout is provided based on this match. As is also seen in screen 310, a three-in-a-row match has also occurred as indicated in row 314. This latter sequence 314 may or may not be included in the payout. This could depend on the rules of the particular game, or could be dependent on particular wagers.

Figure 4:
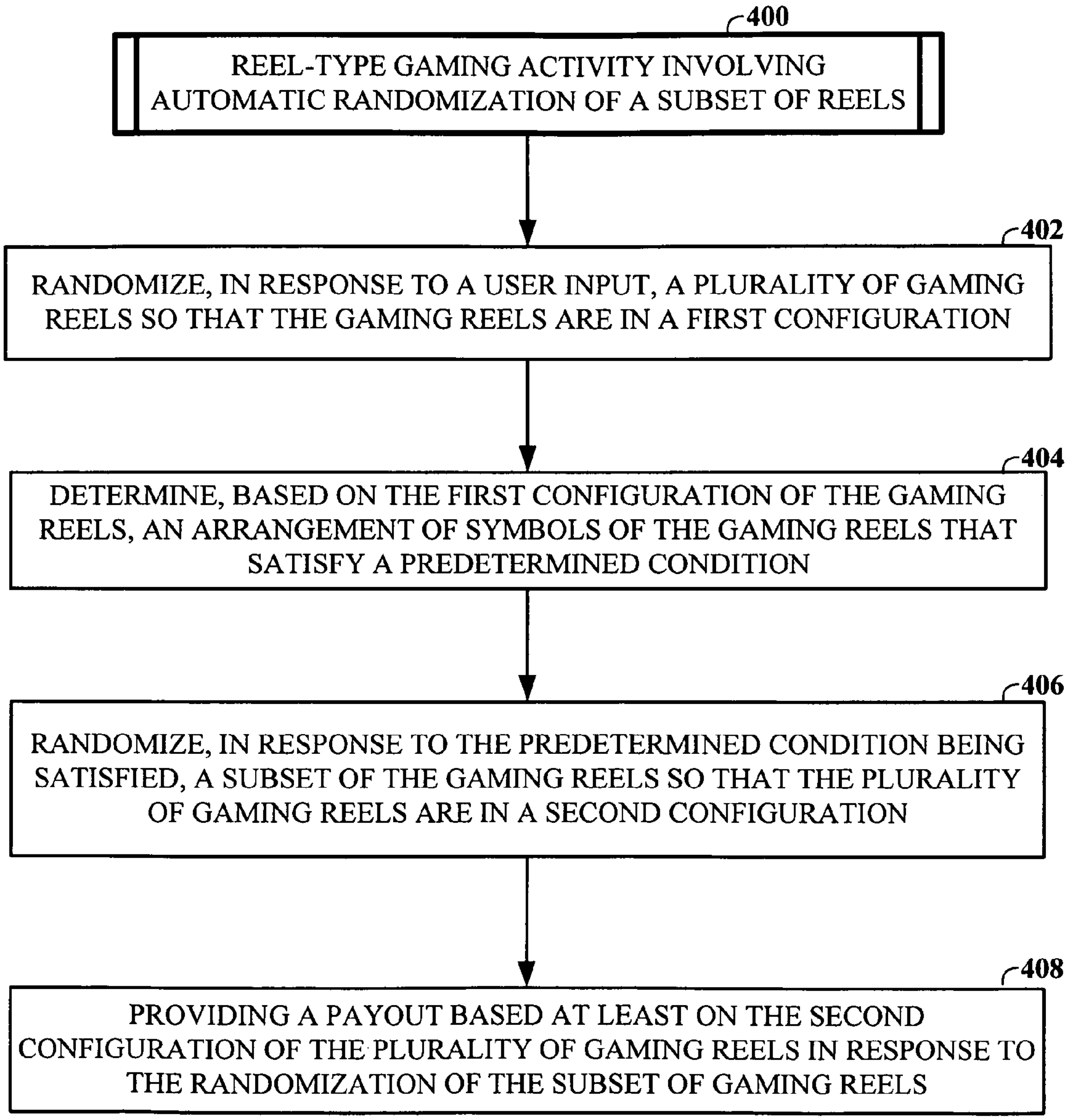
FIG. 4 is a flowchart illustrating a gaming procedure according to an embodiment of the invention.

In reference now to FIG. 4, an example procedure 400 is illustrated for providing a gaming experience according to embodiments of the invention. In response to a user input, a plurality of gaming reels is randomized 402 so that the gaming reels are in a first configuration. Based on the first configuration of the gaming reels, it is determined 404 whether an arrangement of symbols of the gaming reels satisfy a predetermined condition. In response to the predetermined condition being satisfied, a subset of the gaming reels is randomized 406 so that the plurality of gaming reels are in a second configuration. The subset of gaming reels is randomized 406 independently of additional user inputs occurring after the determination of the predetermined condition. The gaming reels not in the subset of reels are held while the subset of gaming reels is randomized. A payout is provided 408 based at least on the second configuration of the plurality of gaming reels in response to the randomization of the subset of gaming reels.

Figure 5:
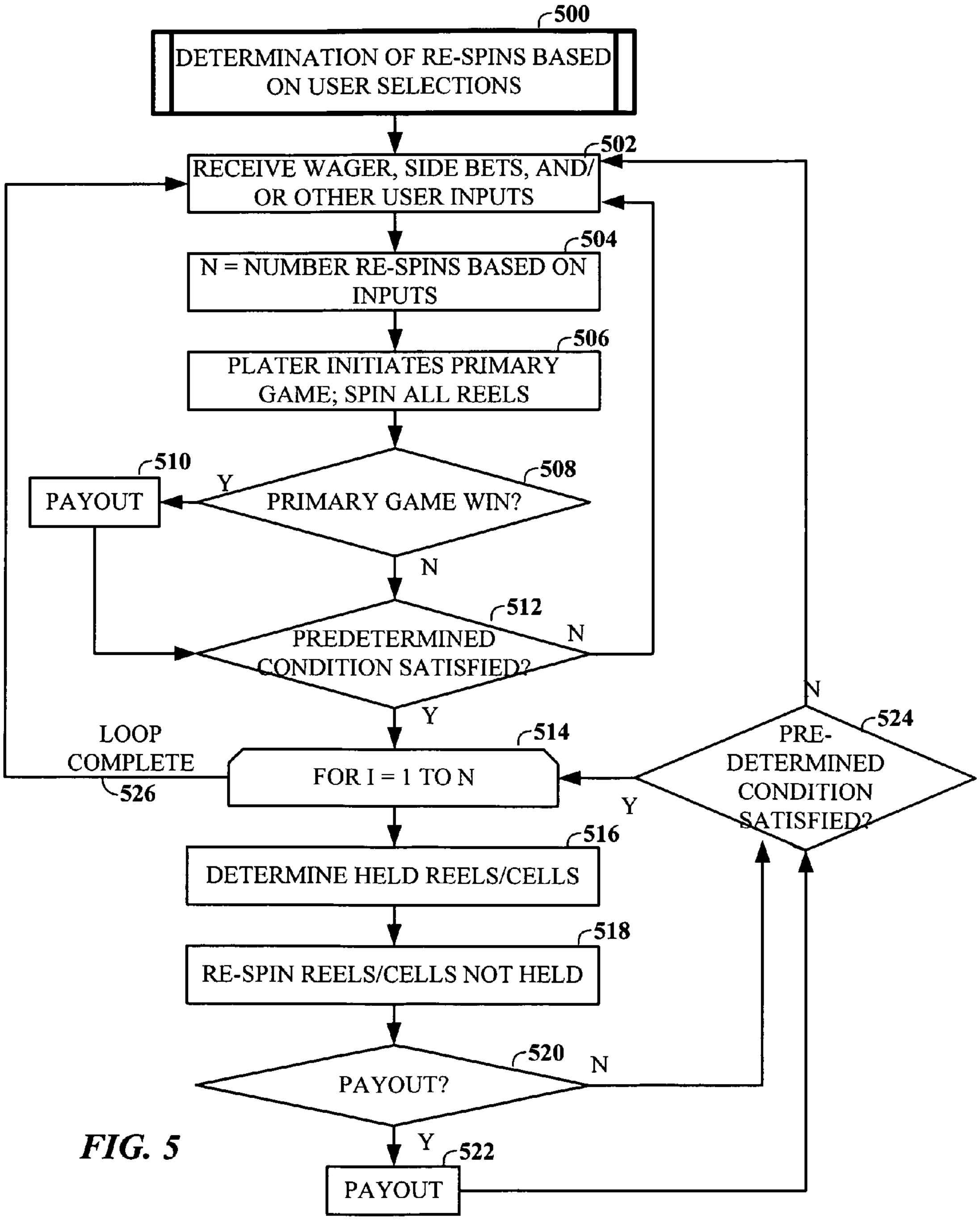
FIG. 5 is a flowchart illustrating a procedure for determining re-spins according to an embodiment of the invention.

As discussed hereinabove, the triggering of selected reel re-spins may be conditioned on a user action taken before the full set of reels is activated. This user action may be a side wager or other selection, and may include the ability to trigger more than one re-spin. In reference now to FIG. 5, a procedure 500 illustrates how user inputs before game play is initiated may affect re-spins according to an embodiment of the invention. A player will provide input 502 such as wagers, side bets, etc., that may or may not enable the re-spinning of selected reels. Based on this input, 502, a variable N is determined 504 based on the wager. In some variations, N may be a constant (e.g., set to one) or may be a function of the wager amount.

The player initiates game play 506 and all reels are spun or otherwise randomized. A determination 508 is made if this spin results in a payout, in which case the payout 510 may be provided or other wise indicated to the player. In either event, a test 512 is made for the existence of a predetermined condition, typically based on arrangement of the reels. In some embodiments, a primary game win 508 may be part of the condition, so that if determination 508 is no, then determination 512 is also always no. In other arrangements, even a non-winning arrangement may still satisfy the condition, e.g., the showing of special symbols in reels and/or other predetermined patterns.

If the predetermined condition 512 is satisfied, then a loop 514 is entered, and may be re-entered multiple times depending on the value of N previously determined 540 as well as other conditions. The loop 514 involves determining 516 which reels are to be held and which are to be re-spun 518. Note that in some game embodiments, individual cells may be randomized instead of re-randomizing a whole reel. After the re-spinning 518, a payout is determined 520 and payout 522 may be provided.

In some variations, the loop 514 may test 524 for the existence of the predetermined condition before continuing. For example, additional re-spins may be dependent on previous re-spins resulting in additional wins 522. If the condition 524 is not satisfied, or the loop is complete, as indicated by path 526, the procedure resumes its initial input condition 502. Note that if N=0, (e.g., player made no side wager), then the loop 514 may terminate 526 even if the predetermined condition 512 is satisfied.

Figure 6:
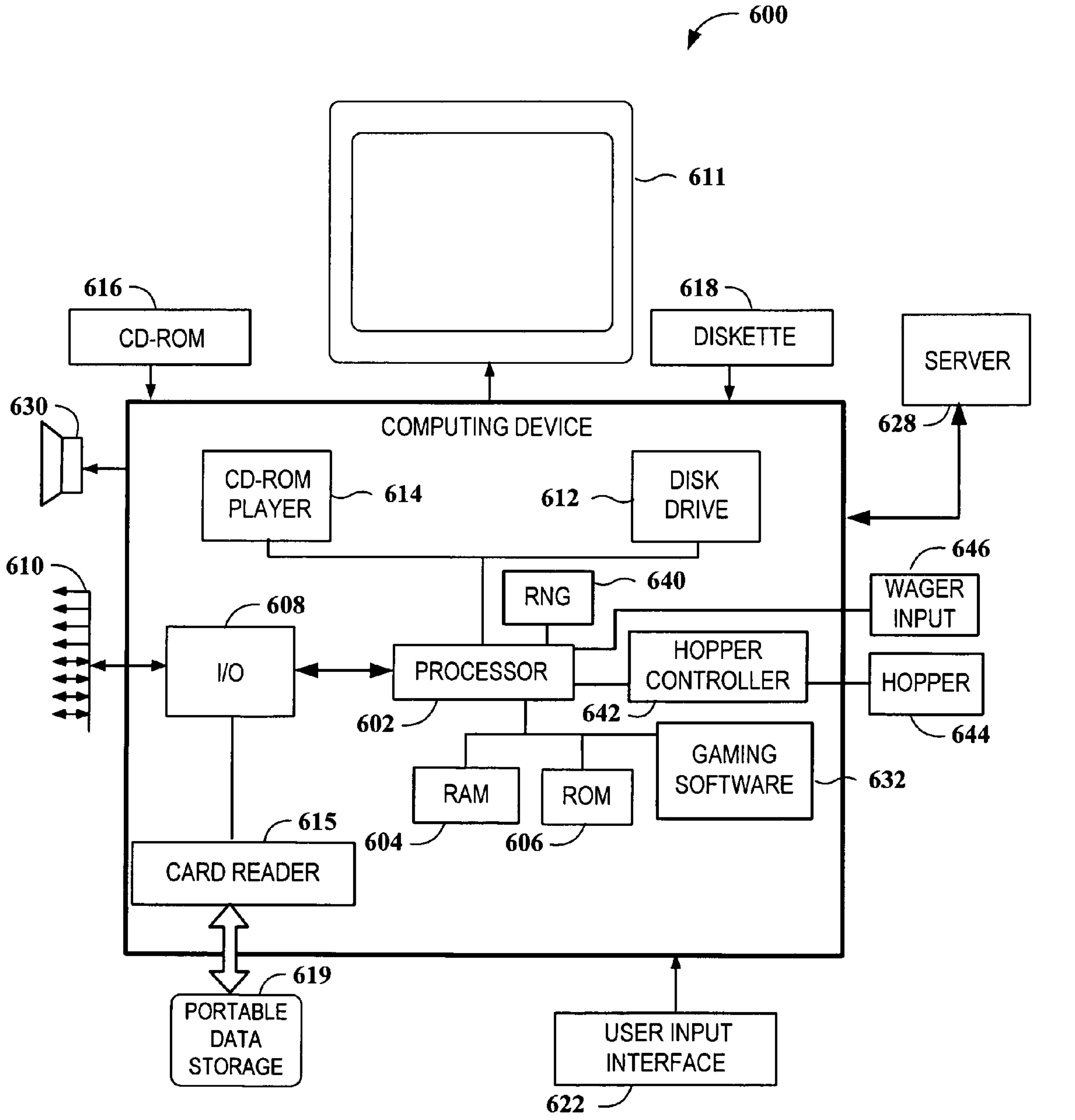
FIG. 6 is a block diagram illustrating a computing arrangement according to an embodiment of the invention.

As may now be readily understood, one or more devices may be programmed to play various embodiments of the invention. The present invention may be implemented as a casino gaming machine such as a slot machine or other special purpose gaming kiosk as described hereinabove, or may be implemented via computing systems operating under the direction of local gaming software, and/or remotely-provided software such as provided by an application service provider (ASP). The casino gaming machines utilize computing systems to control and manage the gaming activity. An example of a representative computing system capable of carrying out operations in accordance with the invention is illustrated in FIG. 6.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 600 of FIG. 6 is an example computing structure that can be used in connection with such electronic gaming machines, computers, or other computer-implemented devices to carry out operations of the present invention.

The example computing arrangement 600 suitable for performing the gaming functions in accordance with the present invention typically includes a central processor (CPU) 602 coupled to random access memory (RAM) 604 and some variation of read-only memory (ROM) 606. The ROM 606 may also represent other types of storage media to store programs, such as programmable ROM (PROM), erasable PROM (EPROM), etc. The processor 602 may communicate with other internal and external components through input/output (I/O) circuitry 608 and bussing 610, to provide control signals, communication signals, and the like.

The computing arrangement 600 may also include one or more data storage devices, including hard and floppy disk drives 612, CD-ROM drives 614, card reader 615, and other hardware capable of reading and/or storing information such as DVD, etc. In one embodiment, software for carrying out the operations in accordance with the present invention may be stored and distributed on a CD-ROM 616, diskette 618, access card 619, or other form of media capable of portably storing information. These storage media may be inserted into, and read by, devices such as the CD-ROM drive 614, the disk drive 612, card reader 615, etc. The software may also be transmitted to the computing arrangement 600 via data signals, such as being downloaded electronically via a network, such as the Internet. Further, as previously described, the software for carrying out the functions associated with the present invention may alternatively be stored in internal memory/storage of the computing device 600, such as in the ROM 606.

The computing arrangement 600 is coupled to the display 611, which represents a display on which the gaming activities in accordance with the invention are presented. The display 611 represents the "presentation" of the video information in accordance with the invention, and may be any type of known display or presentation screen, such as LCD displays, plasma display, cathode ray tubes (CRT), digital light processing (DLP), liquid crystal on silicon (LCOS), etc. Where the computing device 600 represents a stand-alone or networked computer, the display 611 may represent a standard computer terminal or display capable of displaying multiple windows, frames, etc. Where the computing device is embedded within an electronic gaming machine, the display 611 corresponds to the display screen of the gaming machine/kiosk. A user input interface 622 such as a mouse, keyboard/keypad, microphone, touch pad, trackball, joystick, touch screen, voice-recognition system, etc. may be provided. The display 611 may also act as a user input device, e.g., where the display 611 is a touchscreen device.

Chance-based gaming systems such as slot machines, in which the present invention is applicable, are governed by random numbers and processors, as facilitated by a random number generator (RNG). In particular, the fixed and dynamic symbols generated as part of a gaming activity may be produced using one or more RNGs. RNGs are known in the art, and may be implemented using hardware, software operable in connection with the processor 602, or some combination of hardware and software. The present invention is operable using any known RNG, and may be integrally programmed as part of the processor 602 operation, or alternatively may be a separate RNG controller 640.

The computing arrangement 600 may be connected to other computing devices or gaming machines, such as via a network. The computing arrangement 600 may be connected to a network server 628 in an intranet or local network configuration. The computer may further be part of a larger network configuration as in a global area network (GAN) such as the Internet. In such a case, the computer may have access to one or more web servers via the Internet.

Other components directed to gaming machine implementations include manners of gaming participant payment, and gaming machine payout. For example, a gaming machine including the computing arrangement 600 may also include a hopper controller 642 to determine the amount of payout to be provided to the participant. The hopper controller may be integrally implemented with the processor 602, or alternatively as a separate hopper controller 642. A hopper 644 may also be provided in gaming machine embodiments, where the hopper serves as the mechanism holding the coins/tokens of the machine. The wager input module 646 represents any mechanism for accepting coins, tokens, coupons, bills, electronic fund transfer (EFT), tickets, credit cards, smart cards, membership cards, etc., for which a participant inputs a wager amount. It will be appreciated that the primary gaming software 632 may be able to control payouts via the hopper 644 and controller 642 for independently determined payout events.

Among other functions, the computing arrangement 600 provides an interactive experience to players via input interface 622 and output devices, such as the display 611, speaker 630, etc. These experiences are generally controlled by gaming software 632 that controls a primary gaming activity of the computing arrangement 600. The gaming software 632 may be temporarily loaded into RAM 604, and may be stored locally using any combination of ROM 606, drives 612, or media player 614. The primary gaming software 632 may also be accessed remotely, such as via the server 628 or the Internet.

The primary gaming software 632 in the computing arrangement 600 according to embodiments of the present invention provides a floating reel-type gaming experience as defined hereinabove. For example, the software 632 may present, by way of the display 611, a plurality of gaming reels each having a plurality of symbols that are randomly arranged in response to gaming events. The software 632 controls the reels by randomizing, in response to a user input, the reels so that the gaming reels are in a first configuration. Based on the first configuration of the gaming reels, the software 632 determines an arrangement of the symbols that satisfy a predetermined condition. In response to the predetermined condition being satisfied, the software 632 randomizes a subset of the gaming reels so that the plurality of gaming reels are in a second configuration. The software 632 causes payout devices 642, 644 to provide a payout based at least on the second configuration of the plurality of gaming reels in response to the randomization of the subset of gaming reels.

Figure 7:
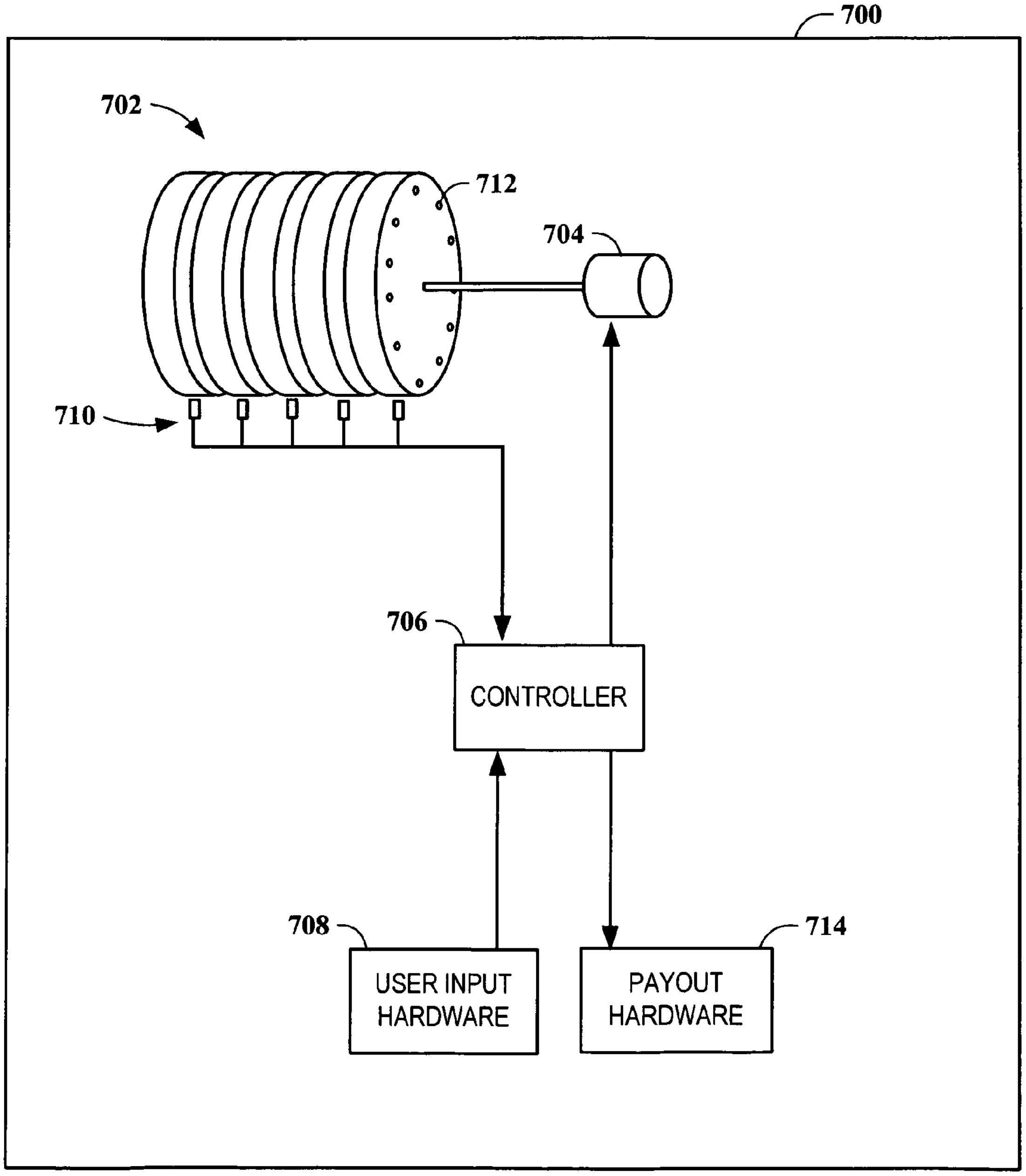
FIG. 7 is a block diagram illustrating an electro-mechanical apparatus according to an embodiment of the invention.

It will be appreciated that the above functionality described in relation to a computer implemented gaming apparatus may also be applied to electromechanical apparatus as well. In reference now to FIG. 7, an apparatus 700 according to an embodiment of the invention is illustrated. The apparatus includes mechanical reels 702 that generally have symbols printed on an outer surface. The reels 702 are controlled by one or more motors 704, which receive commands from a controller 706. The motor 704 may be rotary or linear (e.g., solenoid and/or linear stator device). The motor 704 may cause the reels 702 to turn, or a mechanical device such as a lever (not shown) may cause the reels to turn in response to user activation. In the latter case, the motor 704 may cause the reels 702 to randomly stop, such as by applying a braking force to a hub or shaft.

The controller 706 may be include digital and/or analog circuitry that implements the logic and control functions of the apparatus. The controller 706 receives user inputs via input hardware 708, and in response may cause the motor 704 to randomize all of the reels 702 into a first configuration. The controller may be coupled to sensors 710 that detect reel positions, such as by optical, magnetic, or other markers located on the reels 702, as illustrated by marker 712. Based on the first configuration, the controller 706 may cause a payout to be provided by way of payout hardware 714. Additionally, the controller determines an arrangement of the reels 702 that satisfies a predetermined condition. In response to the predetermined condition being satisfied, the controller 706 randomizes a subset of the reels 702 so that the reels 702 are in a second configuration. The controller 706 causes payout hardware 714 to provide a payout based at least on the second configuration of the reels 702 in response to the randomization of the subset of reels.

The foregoing description of the exemplary embodiments of the invention has been presented for the purposes of illustration and description. It is not intended to be exhaustive or to limit the invention to the precise form disclosed. Many modifications and variations are possible in light of the above teaching. For example, the present invention is equally applicable in electronic or mechanical gaming machines, and is also applicable to live table versions of the gaming activities. It is intended that the scope of the invention be limited not with this detailed description, but rather determined from the claims appended hereto.

What is claimed is:

1. A gaming apparatus comprising:

a plurality of gaming reels each having a plurality of symbols that are randomly arranged in response to gaming events;

a controller coupled to the gaming reels and configured to:

randomize, in response to a user input, the plurality of gaming reels so that the gaming reels are in a first configuration;

determine, based on the first configuration of the gaming reels, whether an arrangement of the symbols on the gaming reels has formed a winning condition that is already entitled to a payout;

if the arrangement of the symbols on the gaming reels formed a winning condition that is already entitled to a payout, identify a first subset of the gaming reels as reels having the symbols used in the formation of the winning condition, identify a second subset of the gaming reels as the remaining reels not in the first subset of gaming reels, and randomize the second subset of gaming reels so that the plurality of gaming reels are in a second configuration, wherein the second subset of gaming reels is randomized independently of any user inputs occurring after the determination of the winning condition, and wherein the first set of gaming reels is held while the second subset of gaming reels is randomized; and if the arrangement of the symbols on the gaming reels did not form a winning condition that is already entitled to a payout, foregoing any further randomization of the gaming reels; and a payout device that determines a final payout based at least on the second configuration of the plurality of gaming reels in response to the randomization of the second subset of gaming reels.

2. The gaming apparatus of claim 1, wherein the winning condition comprises a sequence of matching symbols located in neighboring cells of the held gaming reels.

3. The gaming apparatus of claim 2, wherein the winning condition requires that the matching symbols be high symbols selected from the plurality of symbols.

4. The gaming apparatus of claim 1, wherein the winning condition includes a wild symbol being located in one or more of the held gaming reels.

5. The gaming apparatus of claim 1, wherein the winning condition comprises a special symbol being located in one or more of the held gaming reels, wherein the special symbol at least designates that the winning condition is satisfied for the one or more of the held gaming reels.

6. The gaming apparatus of claim 5, wherein the winning condition further comprises a user selection that occurs before the gaming reels are randomized into the first configuration.

7. The gaming apparatus of claim 6, wherein the user selection includes a side wager.

8. The gaming apparatus of claim 7, wherein the controller further causes one or more of the second subset of the gaming reels to be repeatedly randomized in response to the winning condition being satisfied, wherein a number of the repeated randomizations is determined by an amount of the side wager.

9. The gaming apparatus of claim 1, wherein the controller further causes one or more of the second subset of the gaming reels to be randomized two or more times in response to the winning condition being satisfied.

10. The gaming apparatus of claim 9, wherein the one or more of the second subset of the gaming reels comprises the entire second subset of the reels.

11. The gaming apparatus of claim 9, where the one or more of the second subset of the gaming reels comprises a selected subset of the second subset of the gaming reels, wherein the selected subset is determined based on gaming reels that are in the second subset of the gaming reels but not in the selected subset forming the winning condition with the held reels.

12. A method comprising:

randomizing, in response to a user input, a plurality of gaming reels so that the gaming reels are in a first configuration;

determining, based on the first configuration of the gaming reels, whether an arrangement of symbols on the gaming reels has formed a winning condition that meets a payout condition;

only in response to the winning condition having occurred, identifying a first subset of the gaming reels as reels having all of the symbols used in the formation of the winning condition, identifying a second subset of the gaming reels as the remaining reels not in the first subset of gaming reels, randomizing the second subset of gaming reels so that the plurality of gaming reels are in a second configuration, wherein the second subset of gaming reels is randomized independently of additional user inputs occurring after the determination of the winning condition, and wherein the first set of gaming reels is held while the second subset of gaming reels is randomized; and providing a final payout based at least on the second configuration of the plurality of gaming reels in response to the randomization of the second subset of gaming reels.

13. The method of claim 12, wherein the winning condition comprises a sequence of matching symbols located in neighboring cells of the held gaming reels.

14. The method of claim 13, wherein the winning condition requires that the matching symbols be high symbols selected from the plurality of symbols.

15. The method of claim 12, wherein the winning condition comprises a wild symbol being located in one or more of the held gaming reels.

16. The method of claim 12, wherein the winning condition comprises a special symbol being located in one or more of the held gaming reels, wherein the special symbol at least designates that the winning condition is satisfied for the one or more of the held gaming reels.

17. The method of claim 16, wherein the winning condition further comprises a user selection that occurs before the gaming reels are randomized into the first configuration.

18. The method of claim 17, wherein the user selection includes a side wager.

19. The method of claim 18, wherein randomizing the second subset of the gaming reels comprises repeatedly randomizing one or more of the second subset of the gaming reels to be in response to the winning condition being satisfied, wherein a number of the repeated randomizations is determined by an amount of the side wager.

20. The method of claim 12, wherein randomizing the second subset of the gaming reels comprises randomizing one or more of the second subset of the gaming reels two or more times in response to the winning condition being satisfied.

21. The method of claim 20, wherein the one or more of the second subset of the gaming reels comprises the entire second subset of the reels.

22. The method of claim 20, where the one or more of the second subset of the gaming reels comprises a selected subset of the second subset of the gaming reels, wherein the selected subset is determined based on gaming reels that are in the second subset of the gaming reels but not in the selected subset forming the winning condition with the held reels.

23. A gaming apparatus comprising:

a plurality of gaming reels each having a plurality of symbols;

a game display configured to show one or more symbols from each gaming reel in response to gaming events;

a controller coupled to the gaming reels, the controller configured to:

randomly determine a first game outcome including determining which symbols on each gaming reel to show on the game display;

manipulate the plurality of gaming reels to display the first game outcome on the game display;

determine, based on the first game outcome, whether a winning condition that is entitled to a payout is present on the game display;

when a winning condition has been determined to be present on the game display:

identifying a first subset of the gaming reels as reels that include symbols that are part of winning condition, identifying a second subset of the gaming reels as the remaining reels not in the first subset of gaming reels, determining a second game outcome by maintaining the symbols displayed on the first subset of gaming reels and randomly selecting which of the plurality of symbols to display on the game display for the each of the second subset of gaming reels, and manipulating the second subset of gaming reels to display the second game outcome on the game display; and a payout device configured to award any payouts based on the first game outcome and the second game outcome.

24. The gaming apparatus of claim 23, wherein the controller is further configured to repeatedly determine second game outcomes and manipulated the second subset of gaming reels to show the determined second game outcomes until a condition has been satisfied.

25. The gaming apparatus of claim 23, wherein the controller is further configured to determine whether a winning condition that is entitled to a payout based on the first game outcome includes a predefined symbol, and wherein the controller only identifies a first subset of the gaming reels, identifies a second subset of the gaming reels, determines a second game outcome, and manipulates the second subset of gaming of gaming reels when the winning condition includes the predefined symbol.

* * * * *